United States Patent
White et al.

(10) Patent No.: US 8,859,635 B2
(45) Date of Patent: *Oct. 14, 2014

(54) CROSS-LINKABLE SILICONE COMPOSITION FOR THE PRODUCTION OF NON-STICK COATINGS FOR FLEXIBLE SUPPORTS AND ATTACHMENT PROMOTING ADDITIVE CONTAINED IN THIS COMPOSITION

(75) Inventors: John White, Letra (FR); Michel Feder, Villeurbanne (FR); Alain Pouchelon, Meyzieu (FR); Yassine Maadadi, Meyzieu (FR); Lucile Gambut-Garel, Lyons (FR)

(73) Assignee: Bluestar Silicones France SAS, Lyons (FR)

( * ) Notice: Subject to any disclaimer, the term of this patent is extended or adjusted under 35 U.S.C. 154(b) by 52 days.

This patent is subject to a terminal disclaimer.

(21) Appl. No.: 13/169,215

(22) Filed: Jun. 27, 2011

(65) Prior Publication Data

US 2011/0257288 A1 Oct. 20, 2011

Related U.S. Application Data

(63) Continuation of application No. 12/304,554, filed as application No. PCT/EP2007/056432 on Jun. 27, 2007, now Pat. No. 8,093,339.

(30) Foreign Application Priority Data

Jun. 29, 2006 (FR) ...................... 06 52699

(51) Int. Cl.
*C08L 83/04* (2006.01)
*C09D 183/04* (2006.01)
*C08G 77/20* (2006.01)
*C08G 77/00* (2006.01)
*C08G 77/18* (2006.01)
*C08G 77/14* (2006.01)

(52) U.S. Cl.
CPC ............... *C08L 83/04* (2013.01); *G08G 77/12* (2013.01); *C08G 77/20* (2013.01); *C09D 183/04* (2013.01); *C08G 77/80* (2013.01); *C08G 77/18* (2013.01); *C08G 77/14* (2013.01); *C08G 77/70* (2013.01)

USPC ............... 522/99; 525/477; 525/478; 528/15; 528/31; 528/32; 522/31; 522/148

(58) Field of Classification Search
None
See application file for complete search history.

(56) References Cited

U.S. PATENT DOCUMENTS

| | | | |
|---|---|---|---|
| 5,166,293 | A | 11/1992 | Okinoshima et al. |
| 5,279,860 | A | 1/1994 | Griswold et al. |
| 5,789,084 | A | 8/1998 | Nakamura et al. |
| 6,218,445 | B1 | 4/2001 | Priou et al. |
| 6,425,600 | B1 | 7/2002 | Fujiki et al. |
| 7,838,118 | B2 | 11/2010 | Mizushima et al. |
| 2004/0161618 | A1 | 8/2004 | Griswold et al. |
| 2006/0127682 | A1 | 6/2006 | Griswold et al. |

FOREIGN PATENT DOCUMENTS

EP 556 023 8/1993

OTHER PUBLICATIONS

Product Data Sheet for SL5000 (no date).
French Preliminary Search Report of FR 06 52699 dated Jan. 25, 2007.
International Search Report of PCT/EP2007/056432 dated Oct. 4, 2007.

*Primary Examiner* — Marc Zimmer
(74) *Attorney, Agent, or Firm* — Pearne & Gordon LLP

(57) ABSTRACT

Silicone composites subject to reticulation or reticulated, particularly for creating a coating or water-repellent and anti-adhesive film for flexible substrates such as paper or similar in the form of natural or synthetic polymer films. These compounds contain reticulating polyorganosiloxanes that have SiH units and unsaturated polyorganosiloxanes, preferably vinylated, suitable for reacting with the reticulating agent in an addition reaction and in the presence of platinum to form the reticulated anti-adhesive coating on the flexible substrate, plus at least one additive (D) to promote adhesion to it. A new liquid silicone compound can be applied without using a solvent, which is beneficial, that can be reticulated instantly to produce an anti-adhesive and/or water-repellent coating for the flexible substrate, giving very high quality reticulated silicone coatings, particularly in terms of sticking/adhering to the substrate, being harder to rub off and the anti-adhesion profile (sufficiently increase detaching force at high speed.

12 Claims, No Drawings

CROSS-LINKABLE SILICONE COMPOSITION FOR THE PRODUCTION OF NON-STICK COATINGS FOR FLEXIBLE SUPPORTS AND ATTACHMENT PROMOTING ADDITIVE CONTAINED IN THIS COMPOSITION

The field of the invention is that of cross-linkable or cross-linked silicone compositions, capable of being used, in particular, to form a coating or water-repellent and non-stick film for flexible supports for example made of paper or similar materials and in the form of natural or synthetic polymer films.

These curable, non-stick silicone compositions are applied to such supports, in order to facilitate the removal of adhesive materials laminated in a reversible manner on these supports.

More precisely, the invention relates to the silicone compositions of the type of those comprising:

functionalized polyorganosiloxanes (POSs) carrying, on the same molecule or not on the same molecule, Si—H $[(M)_{a'\geq 0}(M^H)_{b'\geq 0}(D^H)_{c'\geq 0}(D)_{d'\geq 0}]$ and Si-alkenyl, preferably Si-vinyl(Vi) $[(M)_{a''\geq 0}(M^{Vi})_{b''\geq 0}(D^{Vi})_{c''\geq 0}(D)_{d''\geq 0}]$ units; the Si—H units being capable of reacting with the Si-alkenyl units by addition reaction; the definitions of the symbols used above being as follows: M: $(R_3SiO_{1/2})$; D: $(R_2SiO_{2/2})$; $M^H$ or M': $(R_2HSiO_{1/2})$; $D^H$ or D': $(RHSiO_{2/2})$; $M^{Vi}$: $(R_2SiO_{1/2})$; $D^{Vi}$: $(RViSiO_{2/2})$; T: $(RSiO_{3/2})$; Q: $(SiO_{4/2})$; Vi=vinyl; R=methyl or other hydrocarbon group different from —O—Si≡, for example alkyl or aryl;

an appropriate metal catalyst preferably platinum;

optionally a cure regulator (retarder, inhibitor);

optionally at least one adhesion modulating system, for example based on silicone resin comprising siloxyl units Q and/or T;

optionally other additives (fillers, accelerators, inhibitors, pigments, surfactants, "processing aid" operating auxiliary (for example antimisting additive.

The invention also relates to the preparation of this type of silicone compositions.

The invention also relates to the methods for producing silicone coatings e.g. water-repellent and/or non-stick coatings for flexible supports (e.g. paper or polymer films), from the abovementioned compositions.

These liquid silicone compositions are applied to the support films in industrial coating devices comprising cylinders operating at very high speed (for example 600 m/min). It is clear that in these very high-speed coating procedures, the viscosity of the liquid silicone coating composition must be meticulously adapted to the coating operation conditions. In practice, the deposition rate of non-stick silicone is comprised between 0.1 and 2, preferably 0.3 and 1 g/m², which corresponds to thicknesses of the order of a micrometer. Once applied to the flexible support, the silicone composition cross-links to form a solid non-stick and/or water-repellent silicone coating (e.g. elastomer).

Given the very high-speed industrial coating rates, the cross-linking kinetics must be extremely rapid in order to produce a correct cross-linking, i.e. the non-stick silicone films must be sufficiently cross-linked to be able best to perform their non-stick function and possess the desirable mechanical qualities. The evaluation of the quality of the cross-linking of the non-stick silicone coating can in particular be carried out by means of an assay of the non-cross-linked extractable compounds, the quantity of which must be reduced as much as possible. For example, the level of extractables is preferably less than 5%, under normal industrial cross-linking conditions.

The non-stick quality of the outer surface which is free of the silicone coating is expressed by means of the peel force, which must be weak and controlled, for the element intended to be arranged on the support coated by the non-stick silicone film. In a standard fashion, this element can be the adhesive surface of a label or a tape of the same name.

Thus, in addition to this weak and controlled non-stick quality, the adhesion of the silicone coating to its support must be very high. This adhesion property is judged for example using the "rub off" test, which involves rubbing the surface of the coating with a finger and measuring the number of successive passes before degradation of the coating.

It is also important that these silicone coating compositions, which are cross-linkable by hydrosilylation e.g. Si—H/Si-Vi, have the longest possible service life at ambient temperature, when they are in the form of a coating bath in industrial coating machines. Flexible supports coated with a non-stick silicone film can be for example:

an adhesive tape, the inner surface of which is coated with a pressure-sensitive layer of adhesive and the outer surface of which comprises the non-stick silicone coating;

or a paper or a polymer film for protecting the adhesive surface of a self-adhesive or pressure-sensitive adhesive element;

or a polymer film of polyolefin type (polyvinyl chloride (PVC), PolyPropylene or Polyethylene) or of polyester type (PolyEthyleneTerephthalate—PET—).

Within the framework of the present invention, there is particular interest in, but not limited to, liquid silicone compositions for coating flexible polymer supports (polyester e.g. made of PET). In fact, one of the advantages of PET films is due to their very small thickness (20 μm) which makes it possible to significantly limit the bulk of rolls of film.

Moreover, for obvious reasons of handling safety and toxicity, the present invention relates for example to silicone compositions which are advantageously solvent-free.

Beyond this aspect, it is essential that, from an economic point of view, these advantageously solvent-free silicone coating compositions, in particular for supports made of polymer, in particular made of polyester, e.g. made of PET, can be used on standard industrial coating equipment suitable for flexible supports made of paper. This assumes that said compositions have a relatively low viscosity (for example less than or equal to 1000 mPa·s) in order to facilitate their handling, to have a good coating quality and to reduce the problem of misting which appears at very high industrial coating speeds.

Another constraint to be taken into account for the formulation of the liquid silicone coating compositions is that the coefficient of friction of the cross-linked silicone elastomer coating should be controllable, in order to facilitate rolling/unrolling operations of the flexible polymer supports (in particular made of polyester such as PET), which are useful as "liners" for labels.

It is important for this application that the silicone elastomer coating is detrimental neither to the smoothness, nor to the transparency, nor to the mechanical properties of the support. The smoothness and the mechanical properties are necessary for precision trimming at very high speed. The transparency is desirable for inspection of the uniformity of the film at very high speed, using optical detectors.

In a non-stick coating, control of the peel force is important. Advantageously, this control must be effective at low and at high speed. The balance between the low speed peel forces and the high speed peel forces is commonly called the non-stick profile.

Beyond the properties referred to above for all supports, and in particular polyester supports, e.g. PET), the adhesion or attachment of the silicone coating to the support (Manifested by the "rub-off" abrasion resistance) should be optimum and stable over time, even in the presence of the label adhesive.

Now, within the framework of the invention, there is more special interest in the optimization of this parameter of adhesion or attachment of the silicone coating to the support, without prejudice to the other specifications.

In order to do this, it is provided to use at least one attachment promoter in the silicone compositions capable of cross-linking/curing by polyaddition, in order to form a water-repellent, non-stick coating on any support.

From the application US-A-2004/0161618, non-stick silicone compositions are known, having improved adhesion to paper or polymer supports and comprising alkenylated linear POSs $M^{Vi}_{2-5} D_{50-1000} T_{a'''\geq 0} M_{0-0.5}$, linear POSs with Si—H units, a platinum catalyst, a cross-linking inhibitor, and, as an attachment promoting additive, a POS of MDM type carrying active functional grafts of epoxy, oxirane or carboxy type. More precisely, this additive can be of the $MD^{AGE}D'M$ [AGE=allylglycidylether] or $MD^{alkoxysilyl}D^{carboxy}D'M$ type. This additive has the drawback of comprising a significant content of SiH units, namely at least one SiH unit per molecule or at least 0.24% by weight of SiH units. With this residual content, their biofunctionality and their reactivity, such additives are naturally somewhat unstable, so their preservation during storage is very limited; their viscosity increases rapidly until gelling occurs, which, depending on the case, may be in a few days or a few months; the additive then becomes unusable.

In this context, the essential objective of the present invention is to propose novel liquid silicone coating compositions, advantageously solvent-free, which are cross-linkable in a non-stick and/or water-repellent coating for flexible supports, instantaneously and leading to cross-linked silicone coatings of very good quality, in particular in terms of attachment/adhesion to the support ("high rub-off") and with a non-stick profile (peel force at a sufficiently high speed), these last properties resulting in particular from an attachment promoting additive.

Another essential objective of the invention is to propose novel liquid silicone coating compositions, advantageously solvent-free, which can be rapidly cross-linked in non-stick and/or water-repellent coatings for flexible supports, and comprising an attachment promoting additive which is both effective and has no detrimental effect on the preservation of said compositions.

Another essential objective of the invention is to propose novel liquid silicone coating compositions with an added improved attachment promoter, advantageously solvent-free, which can be rapidly cross-linked in a non-stick and/or water-repellent coating for flexible supports, in particular for polymer films, for example made of polyester of the PET type, the cross-linked coating obtained having:
- on the one hand, sufficient cross-linking to have suitable mechanical and adhesion properties of the coating,
- and, on the other hand, a low level of extractables for a good permanence of the favourable non-stick properties in particular for the preparation and use of the adhesive labels produced from these complexes.

Another essential objective of the invention is to propose novel liquid silicone coating compositions with an added improved attachment promoter, advantageously solvent-free which are rapidly cross-linkable in a non-stick and/or water-repellent coating for flexible supports, in particular for polymer films, for example made of polyester of the PET type, this coating being resistant to prolonged contact with pressure-sensitive adhesives, including acrylic adhesives.

Another essential objective of the invention is to propose novel liquid silicone coating compositions with an added improved attachment promoter, advantageously solvent-free, which are cross-linkable in a non-stick and/or water-repellent coating for flexible supports, particular for polymer films, for example made of polyester of the PET type, this cross-linking taking place rapidly at moderate temperature, instantaneously, these compositions being moreover endowed with long service lives in the bath, at ambient temperature.

Another essential objective of the invention is to propose novel liquid silicone coating compositions with an added improved attachment promoter, advantageously solvent-free, which are cross-linkable in a non-stick and/or water-repellent coating for flexible supports, in particular for polymer films, for example made of polyester of the PET type, these compositions having low viscosities suitable for methods for producing non-stick coatings a high speed, including on standard equipment provided for paper supports, without giving rise to recalcitrant problems of "misting".

Another essential objective of the invention is to propose novel liquid silicone coating compositions with an added improved attachment promoter, which are cross-linkable in a non-stick and/or water-repellent coating for flexible supports, easy to prepare and economical.

Another essential objective of the invention is to propose an improved novel attachment promoter, at least as effective as the known promoters and with no detrimental effect on the preservation of the composition.

Another essential objective of the invention is to propose a novel process for producing a coating which is water-repellent and non-stick on a flexible support (e.g. paper or polymer), preferably a polymer film, more preferably a polymer film made of polyester (for example of PET) having more particularly improved attachment ("rub-off") properties its particular due to an attachment promoting additive, moreover satisfying the requirements for control of the peel force profile, with a low level of extractables and appropriate coefficient of friction, all with an advantageously solvent-free starting composition, with a viscosity compatible with high speed coating without "misting".

Another essential objective of the invention is to propose a novel process for increasing the attachment (i.e. abrasion resistance) of a cross-linked/cured, water-repellent and non-stick silicone coating, applied to any support (e.g. paper or polymer), preferably a polymer film, more preferably a polymer film made of polyester, and obtained from a silicone composition capable of cross-linking/curing by polyaddition and comprising an improved and effective adhesion promoting additive.

Another essential objective of the invention is to propose a novel flexible support, (e.g. paper or polymer), preferably a polymer film, more preferably a polymer film made of polyester (PET), having at least one non-stick, water-repellent coating, based on a silicone composition cross-linked/cured by polyaddition, and having excellent attachment ("rub-off") properties, control of the peel force profile, hardness (% of extractables) and with an appropriate coefficient of friction, all starting with an advantageously solvent-free starting composition, with a viscosity compatible with high speed coating without "misting".

These objectives, among others, are achieved by the present invention which relates firstly to a novel silicone composition capable of cross-linking/curing by polyaddition, to form a coating which is water-repellent and non-stick for supports preferably in the form of polymer films, characterized in that it comprises:

an alkenylated silicone component containing at least one functional silicone oil comprising at least one PolyOrganoSiloxane (POS) comprising units of formula (I.1)

  (I.1)

in which:
W represents independently a functional alkenyl group, preferably C2-C6, and, still more preferably vinyl or allyl,
Z represents independently a monovalent hydrocarbon group, with no unfavourable effect on the activity of the catalyst and chosen, preferably, from the alkyl groups having 1 to 8 carbon atoms advantageously included among the methyl, ethyl, propyl and 3,3,3-trifluoropropyl groups as well as among the aryl groups and, advantageously, among the xylyl and tolyl and phenyl radicals,
a is 1 or 2, b is 0, 1 or 2 and a+b is comprised between 1 and 3;
(B) at least one cross-linking silicone oil comprising at least one hydrogenated POS having, per molecule, at least three hydrogen atoms bound to the silicon;
(C) at least one catalyst comprising at least one metal belonging to the platinum group;
(D) at least one attachment promoting additive containing at least one epoxidated silicone oil comprising at least one PolyOrganoSiloxane (POS) comprising:
units of formula (I.2):

  (I.2)

optionally units of formula (I.3):

  (I.3)

optionally units of formula (I.4):

  (I.4)

optionally units of formula (I.5):

  (I.5)

formulae in which:
Y represents independently a linear, branched or cyclic epoxy-functional hydrocarbon group, preferably C2-C6 and, still more preferably, an alkyl glycidyl ether, a linear, branched and/or cyclic epoxyalkyl (optionally halogenated), a linear, branched and/or cyclic epoxyalkenyl (optionally halogenated), glycidyl-esters of carboxylic acid(s);
Y' represents independently an alkoxy-functional group, preferably C2-C6, and, still more preferably methoxy or ethoxy,
$Z^1$, $Z^2$, $Z^3$, $Z^4$ are groups which correspond to the same definition as that given above for the Z groups in the legend to formula (I.1),
c is 1 or 2, d is 0, 1 or 2 and c+d is comprised between 1 and 3;
e is comprised between 0 and 3;
g is 1 or 2, h is 0, 1 or 2 and g+h is comprised between 1 and 3;
i is 1 or 2, j is 0, 1 or 2 and i+j is comprised between 1 and 3;
this attachment promoting additive (D) comprising, per molecule, less than one Si—H unit, preferably 0.5 Si—H unit at most, and, still more preferably 0.1 Si—H unit at most;
(E) optionally at least one cross-linking inhibitor;
(F) optionally, an adhesion modulating system;
(G) optionally, at least one diluent;
(H) optionally, at least one other functional additive, in particular a "processing aid" operating auxiliary of the "anti-misting" additive type.

It is to the credit of the inventors to have developed a novel attachment promoter constituted by a particularly effective epoxy-functionalized silicone, the SiH unit level of which is zero or virtually zero, in all cases so low that the additive is only slightly or not at all subject to bridging reactions involving SiHs. It can thus be preserved for a prolonged period, for example at least one year, or even at least two years, in a non-gelified liquid state, suitable for use in a composition to be applied to a support in order to form a non-stick coating.

It is to be noted that the properties of attachment to a support are all the more positive, as they last, for example for at least two weeks, even under severe conditions of humidity and/or temperature. This permanence is all the more remarkable as it is also observed when the non-stick coating is in contact with the adhesive, in particular when the latter is an acrylic.

Thanks to the invention, the coatings obtained have not only an excellent attachment ("rub-off"), but are also endowed with a sufficiently high peel force at high speed, and with good mechanical and physical properties (smoothness, transparency and good coefficient of friction).

The performances achieved thanks to the invention in terms of quality of the cross-linking by polyaddition: reactivity/level of cross-linking/kinetics, are extremely useful, as proved by the low level of extractables obtained, with respect to the reactivity and the level of cross-linking.

The coating obtained adheres particularly well to the support, makes it possible to provide the anti-adhesion ("release") property vis-à-vis adhesives of the pressure-sensitive adhesive types, and has an excellent mechanical resistance to prolonged contact with these adhesives, including acrylic adhesives.

These advantageous characteristics can be exploited particularly in order to produce the non-stick property of flexible supports, for example paper or polymer, in particular polymer, in particular polyester, for example PET, which are useful as "liners" of self-adhesive labels (pressure-sensitive adhesive), being presented in the form of rolls or spools of films e.g. produced at very high speed This is all the more useful as these results are obtained with a silicone composition, where the rheological behaviour of the silicone composition is not affected (not too viscous), such that it is perfectly capable of being coated on any support and in particular on any flexible support and is very slightly or not at all subject to "misting" under industrial coating conditions.

Moreover, the silicone coating compositions according to the invention can advantageously be "solvent-free". This means that they are free of solvent and, in particular, free of organic solvent. The advantages that this provides with regard to health and safety are easy to envisage.

The attachment/preservation compromise provided by the additive (D) according to the invention is based at least partly on the absence or virtual absence of SiH units from this additive. Another way of defining the invention in this respect is to indicate that, preferably, the composition according to the invention is characterized in that the Si—H unit content of this additive (D) is less than or equal to 0.15, preferably 0.1, and still more preferably 0.05% by weight in relation to the mass of the POS (or POSs) constituting (D).

Preferably the silicone composition contains predominantly at least a vinylated oil in the chain, an SiH cross-linking agent in the chain, and a high SiH/SiVi ratio.

These compositions can also be used optionally for the treatment of paper supports, in order to provide anti-adhesion properties and with an improved resistance of the silicone coating to aggressive adhesives (for example certain acrylic pressure-sensitive adhesives "PSAs").

As regards quantity, it is advantageous, according to the invention, that the concentration of attachment promoting additive (D) [expressed in % by weight in relation to the total mass of the composition] i.e. comprised between 0.1 and 40, preferably between 0.5 and 20, and, still more preferably between 1 and 18.

Concerning the negligible impact of the attachment promoting additive (D) on the preservation of the part of the silicone composition in which it is present, it is interesting to note that said composition advantageously has a storage stability of at least 6 months (preferably at least one year) when stored in the surrounding air. The storage stability can be for example determined using an objective stability test, which can be defined as the period at the end of which the viscosity of the composition tested has doubled.

All the viscosities to which the present disclosure relates correspond to a so-called "Newtonian" measurable quantity of dynamic viscosity at 25° C., i.e. the dynamic viscosity which is measured, in a manner known per se, at a shear speed gradient which is sufficiently low for the viscosity measured to be independent of the speed gradient.

According to the invention, the attachment promoting additive (D) is chosen from the group of silicones comprising:
1. the POSs containing:
    (I.2) units with c=1 and c+d=2: $D^{epoxy}$
    optionally (I.2) units with c=1 and c+d=3: $M^{epoxy}$
    optionally (I.3) units with e=2: D
    optionally (I.4) units with e=1 and g+h=1: $T^{alkoxy}$
    optionally (I.4) units with e=1 and g+h=2: $D^{alkoxy}$
    optionally (I.4) units with e=1 and g+h=3: $M^{alkoxy}$
    optionally (I.5) units with i=1 and i+j=2: D'
    optionally (I.5) units with i=1 and i+j=3: M'
preferably of formula $$M[D]_{d^o}[D^{alkoxy}]_{d^a}[D^{epoxy}]_{d^e}[D']_{d'}[M^{epoxy}]_{m^e}[M']_{m'}M$$

with
$0 \leq d^o \leq 500$, preferably $0 \leq d^o \leq 300$;
$0 \leq d^a \leq 50$ preferably $0 \leq d^a \leq 40$,
$1 \leq d^e \leq 40$ preferably $2 \leq d^e \leq 30$;
$0 \leq d' < 1$, preferably $0 \leq d' \leq 0.5$;

$0 \leq m' < 1$, preferably $0 \leq m' \leq 0.5$;
d'+m' being less than 1, preferably less than or equal to 0.5;
$0 \leq m^e \leq 2$;
2. the POSs of average formula $M[D]_{d^o}[D^{epoxy}]_{d^e}[M^{epoxy}]_{m^e}M$ with $d^o$, $d^e$, $m^e$ as defined above, and, still more preferably, the POSs of average formula below:

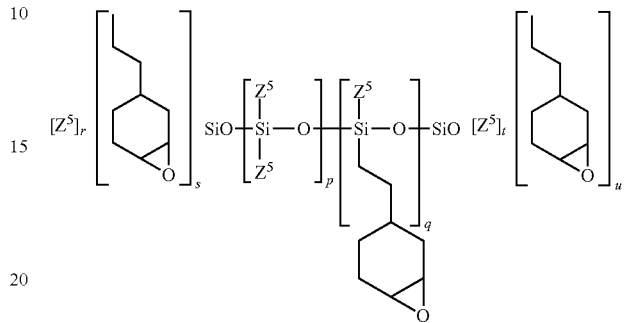

in which:
    the symbols $Z^5$ correspond to groups which are identical to or different from each other and correspond to the same definition as that given above for the Z groups in the legend to formula (I.1);
    $15 \leq p \leq 200$, preferably $50 \leq p \leq 100$, and, still more preferably $75 \leq p \leq 85$;
    $0 \leq q \leq 20$, preferably $1 \leq q \leq 15$, and, still more preferably $6 \leq q \leq 9$;
    r+s=3;
    $0 \leq r \leq 3$;
    $0 \leq s \leq 3$;
    t+u=3;
    $0 \leq t \leq 3$;
    $0 \leq u \leq 3$.
3. and mixtures thereof.

It is understood that the symbols $D^{epoxy}$ $M^{epoxy}$ $M^{alkoxy}$ $D^{alkoxy}$ $T^{alkoxy}$ are siloxy groups functionalized by the group exhibiting them.

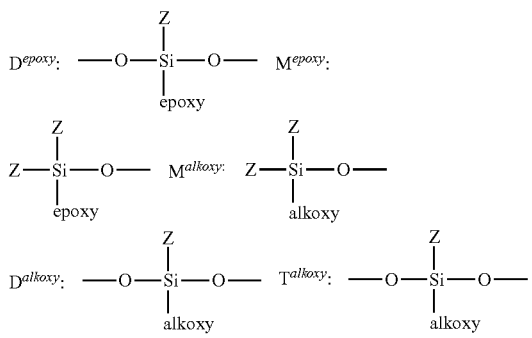

Throughout the present document, reference will be made to standard nomenclature elements in order to designate the M, D, T, Q siloxy units of the POSs. As a reference work, there can be mentioned: NOLL "*Chemistry and technology of silicones*", chapter 1.1, pages 1-9, Academic Press, 1968-2nd edition.

In order to further improve the attachment performances, in particular in the case where (D) comprises POSs (2) as defined above, it has appeared opportune, according to the invention, that the attachment promoting additive (D) comprises at least one photoinitiator Composition (e.g. cationic), preferably chosen from the onium borates, more preferably from the iodonium borates and/or the boranes.

As an example of a photoinitiator composition, there can be mentioned that which corresponds to the formula.

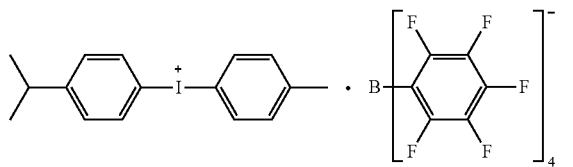

For more details on the appropriate onium borates, reference may be made, for example, to the following patent applications or patents: U.S. Pat. No. 6,864,311; U.S. Pat. No. 6,291,540; U.S. Pat. No. 5,468,902.

The photoinitiator composition is advantageously diluted in a protic solvent, for example isopropyl alcohol. The dilution level is e.g. comprised between 10 and 30%, in particular equal to 20%+/−2.

In the case where the composition comprises a photoinitiator composition, the coating can be subjected to heat and/or actinic exposure, for example UV, in order to speed up the reaction.

For more details on the appropriate boranes, reference may be made, for example, to the following patent applications or patents: U.S. Pat. No. 6,743,883; US-A-2004-0048975.

It has appeared particularly judicious according to the invention, for the composition to have an Si—H/Si-alkenyl molar ratio, such that:

$1.0 \leq \text{Si—H/Si-alkenyl} \leq 7$ preferably:

$1.5 \leq \text{Si—H/Si-alkenyl} \leq 5$.

According to one possibility among others, the composition comprises an alkenylated silicone component A containing a fraction F1 and a fraction F2 which are different from one another, F2 having an activity which promotes the adhesion to the supports (therefore abrasion resistance) of the non-stick coatings obtained by curing/cross-linking of the composition, and F2 being formed by at least one alkenylated silicone oil chosen from the group comprising:

($A_{2.1}$) the monoalkenylated silicone oils each comprising at least one linear POS having, per molecule, a single end carrying a single alkenyl group (preferably $C_2$-$C_6$) bound to the silicon, and of average linear formula $M^{w}D_mM$ in which M, $M^w$ and D are siloxy units of formula (I.1) with for M: a=0, b=3; $M^w$: a=1, b=2 and for D: a=0, b=2; and m is a natural integer greater than or equal to 150;

($A_{2.2}$) the long silicone oils each comprising at least one linear POS having, per molecule, at each of its ends an alkenyl group (preferably $C_2$-$C_6$) bound to the silicon and of average linear formula $M^{w}D_nM^w$ in which $M^w$ and D are siloxy units of formula (I.1) with for $M^w$: a=1, b=2; and for D: a=0, b=2; and n is natural integer greater than or equal to 250; the viscosity v2 of said oils $A_{2.2}$ being comprised between 3000 and 200000 mPa·s;

($A_{2.3}$) the "weakly" alkenylated silicone oils each comprising at least one linear POS having, per molecule, at least one alkenyl group (preferably $C_2$-$C_6$) bound to the silicon, of average linear formula $(M^{w})_x(M)_y(D)_p(D^{w})_{p'}$, in which M, $M^w$ and D are siloxy units of formula (I.1) with for M,$M^w$: a=1, b=2 and for D: a=0, b=2, $D^w$: a=1, b=1; p, p' are natural integers; x,y=0, 1 or 2, x+y=2, the mass ratio $R^w$ (% by weight) of the alkenyl units to the total mass of the POS $A_{2.3}$ is less than or equal to 0.5, preferably 0.3 and better still 0.2;

and mixtures thereof.

This mass ratio $R^w$ (% by weight) of the Si-alkenyl units to the total mass of F2 with attachment promotion activity, is for example defined as follows:

for $A_{2.1}$ $0.05 \leq R^w \leq 0.2$; preferably $0.07 \leq R^w \leq 0.15$;

for A2.2

$0.05 \leq R^w \leq 0.25$, preferably $0.1 \leq R^w \leq 0.2$.

Advantageously:
A2.1 is, for example, chosen from the group comprising the polydimethylsiloxanes having both (dimethyl)(vinyl)silyl ends and (trimethyl)(vinyl)silyl ends;

A2.2 is, for example, chosen from the group comprising the polydimethylsiloxanes having two (dimethyl)(vinyl)silyl ends;

A2.3 is, for example, chosen from the group comprising the poly(dimethylsiloxy)(methyl-vinylsiloxy)siloxanes with (dimethyl)-(vinyl)silyl ends.

The polyorganosiloxane (I.1) of the alkenylated silicone component A can have a linear, branched or cyclic structure. Its degree of polymerization is, for example, comprised between 2 and 5000.

In a preferred embodiment, A comprises at least one alkenylated silicone oil chosen from the group comprising at least one linear POS having, per molecule, at least two alkenyl groups (preferably $C_2$-$C_6$) bound to the silicon, of average linear formula: $M^{w}_r(D)_q(D^{w})_{q'}M_{r'}$ in which M and D are siloxy units of formula (I.1) with for M: a=0, b=3, for $M^w$: a=1, b=2 and for D: a=0, b=2, $D^w$: a=1, b=1; q and q' are natural integers, r,r'=0, 1 or 2 with r+r'=2;

of viscosity v4 (in mPa·s at 25° C.) defined as follows: $75 \leq v4 \leq 40,000$, preferably $100 \leq v4 \leq 2,000$, and better still $100 \leq v4 \leq 1,000$; and of mass ratio $R^w$ (% by weight) of the Si-alkenyl units to the total mass of the POS of A defined as follows:

$0.1 \leq R^w \leq 3.5$, preferably $0.2 \leq R^w \leq 3$, and better still $0.5 \leq R^w \leq 3$, For example, the fraction F1 can be such an alkenylated silicone oil.

Examples of siloxyl units of formula (I.1) are the vinyldimethylsiloxane unit, the vinylphenylmethylsiloxane unit and the vinylsiloxane unit.

Examples of polyorganosiloxanes (I.1) are the dimethylpolysiloxanes with dimethylvinylsilyl ends, the methylvinyldimethylpolysiloxane copolymers with trimethylsilyl ends, the methylvinyldimethylpolysiloxane copolymers with dimethylvinylsilyl ends, and the cyclic methylvinylpolysiloxanes.

The vinylated oils are commercial products conventionally used for preparing non-stick curable compositions (e.g. U.S. Pat. No. 4,623,700).

The oils with heavier alkenyl or alkenyloxyalkylene groups are described in particular in the patents EP-B-0 219 720 and EP-A-0 454 130.

As regards the cross-linking silicone oil B, it can for example comprise at least one polyorganosiloxane (II.2) comprising the siloxyl units of formula:

$$H_{d'}L_{e'}SiO_{\frac{4-(d'+e')}{2}} \quad (II.2)$$

in which:
L is a monovalent hydrocarbon group with no unfavourable effect on the activity of the catalyst and chosen, preferably, from the alkyl groups having 1 to 8 carbon atoms, advantageously included among the methyl, ethyl, propyl and 3,3,3-trifluoropropyl groups as well as among the aryl groups and, advantageously, among the xylyl and tolyl and phenyl radicals,
d' is 1 or 2, e' is 0, 1 or 2 and d'+e' has a value comprised between 1 and 3;

The dynamic viscosity $\eta d$ (at 25° C.) of this polyorganosiloxane (I.2)$\geq$5, preferably 10 and, still more preferably, is comprised between 20 and 1000 mPa·s.

The polyorganosiloxane (I.2) can have a linear, branched or cyclic structure. The degree of polymerization is greater than or equal to 2. More generally, it is less than or equal to 5,000.

Examples of units of formula (I.2) are:
M': $H(CH_3)_2SiO_{1/2}$, D': $HCH_3SiO_{2/2}$, D': $H(C_6H_5)SiO_{2/2}$.
Examples of polyorganosiloxane (1.2), i.e. of cross-linking oil (B) are:
M'DD': the dimethylpolysiloxanes with hydrogenodimethylsilyl ends, the poly(dimethylsiloxy)(methylhydrogenosiloxy) α,ω-dimethylhydrogeno-siloxanes,
MDD': the copolymers with dimethyl-hydrogenomethylpolysiloxane units with trimethylsilyl ends,
M'DD': the copolymers with dimethyl-hydrogenomethylpolysiloxane units with hydrogenodimethylsilyl ends,
MD': the hydrogenomethylpolysiloxanes with trimethylsilyl ends,
D'$_4$: the cyclic hydrogenomethylpolysiloxanes.

Examples of these cross-linking oils (B) are given in the U.S. Pat. No. 4,623,700 and the European patent EP-B-0 219 720.

Preferably, the cross-linking silicone oil B comprises:
at least one POS (B1) of the following average linear formula:

$$M_\alpha M'_\beta D_\gamma D'_\delta$$

with
M=$(R^1)_3SiO_{1/2}$
M'=$H_a(R^1)_bSiO_{1/2}$, a+b=3, a=1, 2 or 3, b=0 to 3
D=$(R^2)_2SiO_{2/2}$
D'=$HR^3SiO_{2/2}$
$R^1$, $R^2$, $R^3$ corresponding independently to the same definition as the Z group of formula (I.1)
α=0 to 2, β=2 to 0, δ+γ comprised between 10 and 200, preferably between 20 and 100, more preferably between 30 and 70, and better still γ=0;
having a viscosity v5 (in mPa·s at 25° C.) defined as follows:

5≤v5≤500, preferably 10≤v5≤200, and better still 10≤v5≤100 and having an Si—H titre (% by weight relative to this POS B1) defined as follows:

5≤Si—H≤46, preferably 20≤Si—H≤46, and better still 30≤Si—H≤46;

and/or at least one branched POS (B2) of the following average formula $$M'_hQ_k$$

with
M'=$H_a(R^1)_bSiO_{1/2}$, a+b=3, a=1, 2 or 3, b=0 to 3
Q=$SiO_{4/2}$
4≤h≤20; 1≤k≤4 or 5
having a viscosity v5 (in mPa·s at 25° C.) defined as follows:

5≤v5≤100, preferably 10≤v5≤30;

and having an Si—H titre (% by weight relative to this POS B2) defined as follows:

15≤Si—H≤40, preferably 25≤Si—H≤35, and better still 25≤Si—H≤30.

According to a first variant of the preferred form (B1), α=2, β=0, δ+γ comprised between 10 and 200, preferably between 20 and 100, more preferably between 30 and 70, and better still γ=0.

According to a second variant of the preferred form of (B1):
0≤α≤2
0≤β≤2
0≤γ
0<δ
0≤γ/δ, preferably 0≤γ/δ≤2; and still more preferably 0≤γ/δ≤1.5;
15≤((β/δ)×1000≤150, preferably 15≤(β/δ)×1000≤80; and still more preferably 15≤(β/δ)×1000≤60

The average linear formula of the cross-linking agent (B1) indicated above is a global formula which covers:
-a- cases where the cross-linking agent (B1) comprises the units M M'D D' on the same (preferably linear) POS molecule, the cross-linking agent being able to comprise one or more different M M'D D' molecules,
-b- cases where the cross-linking agent (B1) is formed by a mixture of (preferably linear) POS molecules each bearing some of the M MD D' units,
-c- cases where the cross-linking agent (B1) is formed by a mixture of (preferably linear) cross-linking agents (B1) of types -a- and -b-, as described above.

By way of examples of type -b- cross-linking agents (B1), there can be mentioned the mixtures of (B1) comprising M and D' units and POS comprising M, D and D' units or mixtures of (B1) comprising M and D units and POS comprising M', D and D' units, or mixtures of (B1) comprising M and D' units and POS comprising M and D units, or mixtures of (B1) comprising M' and D' units and POS comprising M and D units.

The polyaddition silicone composition bases (A)(B) according to the invention may comprise only linear polyorganosiloxanes (I.1) and (I.2) such as, for example, those described in the patents: U.S. Pat. No. 3,220,972, U.S. Pat. No. 3,697,473 and U.S. Pat. No. 4,340,709.

The catalysts (C) are also well known. Compounds of platinum and rhodium are preferably used. The complexes of platinum and an organic product described in the U.S. Pat. No. 3,159,601, U.S. Pat. No. 3,159,602, U.S. Pat. No. 3,220,972 and the European patents EP-A-0 057 459, EP-A-0 188 978 et EP-A-0 190 530, the platinum and vinylated organosiloxane complexes described in the U.S. Pat. No. 3,419,593, U.S. Pat. No. 3,715,334, U.S. Pat. No. 3,377,432 et U.S. Pat. No. 3,814,730 can in particular be used. The generally preferred catalyst is platinum. In this case, the quantity by weight of catalyst (II), calculated by weight of platinum metal, is generally comprised between 2 and 500 ppm, preferably between 5 and 200 ppm based on the total weight of the alkenylated silicone component (A) and of the cross-linking oil (B).

In addition to (D), the composition can also include another attachment promoting additive (Dbis). The latter is preferably chosen from the epoxy-functional silanes, preferably from the group comprising:
- (3,4-epoxycyclohexyl)ethyltriethoxy-silane [Coatosil® 1770],
- Tris(3-(trimethoxysilyl)propyl)isocyanurate [A-Link 597],
- (gammaglycidoxypropyl)trimethoxysilane [Dynasilan® GLYMO],
- (gamma methacryloxypropyl)trimethoxysilane [Dynasilan® MEMO],
- silicone compounds comprising both SiVi groups and epoxy-functional groups,
- and mixtures thereof.

The suitable concentrations of additive (Dbis) are, for example, comprised between 0.5 and 5%, preferably between 1 and 3%.

According to a preferred arrangement of the invention, the composition comprises at least one cross-linking inhibitor (E) chosen from the following compounds:
- the polyorganosiloxanes, advantageously cyclic and substituted by at least one alkenyl, tetramethylvinyltetrasiloxane being particularly preferred,
- pyridine,
- phosphines and organic phosphites,
- unsaturated amides,
- dialkyldicarboxylates (U.S. Pat. Nos. 4,256,870; 4,476,166),
- dialkylacetylenedicarboxylates (U.S. Pat. No. 4,347,346)
- alkylated maleates,
- diallylmaleates,
- the acetylenic alcohols (U.S. Pat. Nos. 3,989,866; 4,336,364; 3,445,420),
- and mixtures thereof.

These acetylenic alcohols, (cf. FR-B-1 528 464 and FR-A-2 372 874), which are among the preferred thermal blockers of the hydrosilylation reaction, have the formula:

a formula in which:
$R^4$ is a linear or branched alkyl radical, or a phenyl radical;
$R^5$ is H or a linear or branched alkyl radical, or a phenyl radical;
the $R^4$, $R^5$ radicals and the carbon atom situated in the a position of the triple bond being able optionally to form a ring;
the total number of carbon atoms contained in $R^4$ and $R^5$ being at least 5, preferably from 9 to 20.

Said alcohols are, preferably, chosen from those having a boiling point above 250° C.

There can be mentioned as examples:
ethynyl-1-cyclohexanol 1;
methyl-3 dodecyne-1 ol-3;
trimethyl-3,7,11 dodecyne-1 ol-3;
diphenyl-1,1 propyne-2 ol-1;
ethyl-3 ethyl-6 nonyne-1 ol-3;
methyl-3 pentadecyne-1 ol-3.

These α-acetylenic alcohols are commercial products.

Such a retarder is present in such a quantity that it inhibits the action of the catalyst at ambient temperature, this inhibiting action ceasing during the high-temperature cross-linking treatment; this quantity is generally of the order of 3000 ppm maximum, preferably 100 to 2500 ppm relative to the total weight of the alkylenated silicone component (A) and of the silicone oil (B), in particular in the case where the hydrosilylation inhibiting agent is ethynylcyclohexanol, According to a variant, the non-stick cross-linkable silicone composition contains at least one adhesion modulating system (F).

This adhesion modulating system (F) is selected from the known systems. These may be those described in the French patent FR-B-2 450 642, the U.S. Pat. No. 3,772,247 or the European patent application EP-A-0 601 938. As examples, there may be mentioned the modulators based on:
- 96 to 85 parts by weight of at least one reactive polyorganosiloxane resin (A) of type: $MD^{Vi}Q$, $MM^{Vi}Q$, $MD^{Vi}T$, $MM^{Hexenyl}Q$, or $MM^{Allyloxypropyl}Q$
- 4 to 15 parts by weight of at least one non-reactive resin (B) of type: MD'Q, MDD'Q, MDT', MQ, or MDQ.

According to a preferred characteristic of the invention, the concentration of [(F)], in % by dry weight relative to the total mass of the composition, is defined as follows:
[(F)]≤20
preferably [(F)]≤15
and still more preferably (F)]≤10.

It has in fact been observed, within the framework of the invention, that the performances of the modulating system are optimized, to the extent that care is taken to introduce it into the non-stick silicone composition, in a quantity such that F does not represent more than 20% by dry weight, relative to the total mass of the composition.

The diluent (G) optionally present in the composition is advantageously chosen from the alpha olefins in particular those comprising 4 to 15 carbon atoms per molecule.

Other functional additives (H) can be incorporated in the composition. These additives can be chosen from the fillers such as for example glass microbeads, anti-misting agents etc.

Advantageously, the complete curable compositions ABC (D)(E)(G)(H)—the (-) components being optional—are fluid at normal temperature; their viscosity can be, for example, a viscosity v (in mPa·s at ° C.) defined as follows:

100≤v≤3,000, preferably 200≤v≤2,000, and better still 500≤v≤1,000;

The preparation of the silicone composition according to the invention, which can be used in particular as a coating base for producing non-stick and water-repellent coatings, this composition being of the type of that defined above, simply involves mixing the constituents ABC(D)(E)(F)(G) (H) using mixing means and methods known to a person skilled in the art.

The invention also relates, as a novel product per se, to an attachment promoting additive for a silicone composition capable of cross-linking/curing by polyaddition, in order to form a water-repellent, non-stick coating on a support, characterized in that it comprises at least one epoxidated silicone oil comprising at least one PolyOrganoSiloxane (POS) comprising:
units of formula (I.2):

optionally units of formula (I.3):

$$Z_e^2 SiO_{\frac{4-e}{2}} \quad (I.3)$$

optionally units of formula (I.4):

$$Y'_g Z_h^3 SiO_{\frac{4-(g+h)}{2}} \quad (I.4)$$

optionally units of formula (I.5):

$$H_i Z_j^4 SiO_{\frac{4-(i+j)}{2}} \quad (I.5)$$

formulae in which:
- Y represents independently a linear, branched or cyclic epoxy-functional hydrocarbon group, preferably C2-C6, and, still more preferably, an alkyl glycidyl ether, a linear, branched and/or cyclic epoxyalkyl (optionally halogenated), a linear, branched and/or cyclic epoxyalkenyl (optionally halogenated), glycidyl-esters of carboxylic acid(s);
- Y' represents independently an alkoxy-functional group, preferably C2-C6, and, still more preferably methoxy or ethoxy,
- $Z^1, Z^2, Z^3, Z^4$ are groups which correspond to the same definition as that given above for the Z groups in the legend to formula (I.1),
- c is 1 or 2, d is 0, 1 or 2 and c+d is comprised between 1 and 3;
- e is comprised between 0 and 3;
- g is 1 or 2, h is 0, 1 or 2 and g+h is comprised between 1 and 3;
- i is 1 or 2, j is 0, 1 or 2 and i+j is comprised between 1 and 3;
- this attachment promoting additive (D) comprising, per molecule, less than one Si—H unit, preferably 0.5 Si—H unit at most, and, still more preferably 0.1 Si—H unit at most; this additive being preferably as defined above.

The compositions according to the invention can be applied to flexible supports (paper or polymer) preferably formed by films of polymer plastic material selected from the polyolefins (e.g. polyethylene, polypropylene etc.) and/or from the polyesters e.g. PET etc.) the latter being more particularly referred to. This does not however exclude other flexible supports such as papers of various types (supercalendered, layered etc.), cards, cellulose sheets, metal sheets etc.

The flexible supports made of polyester for example of the PET type coated with a non-stick silicone layer, are used as "liners" for adhesive labels.

According to another of its aspects, the invention relates to a process for producing a water-repellent and non-stick coating on a support, preferably a polymer film, more preferably a polymer film made of polyester, characterized in that it consists of applying to this support at least one layer of a silicone composition as defined above, and ensuring that this layer cross-links, preferably by activating it by heating.

These compositions can be applied using devices used on industrial paper coating machines such as for example a five-roll coating head, air-knife or equalizing bar systems, on flexible supports or materials, then cured by circulation in tunnel ovens heated to 70-200° C.; the time for passing through these ovens is a function of the temperature; it is generally of the order of 5 to 15 seconds at a temperature of the order of 100° C. and of the order of 1.5 to 3 seconds at a temperature of the order of 180° C.

The quantities of compositions applied are for example of the order of 0.5 to 2 g per m² of surface to be treated, which corresponds to the application of layers of the order of 0.5 to 2 μm.

The materials or supports thus coated can subsequently be brought into contact with any rubber, acrylic or other pressure-sensitive adhesive materials. The adhesive material can then be easily peeled from said support or material.

According to the invention, for the cross-linking of the coating, the support coated with the polyaddition silicone composition is placed at a temperature preferably less than or equal to 180° C. for less than 10 seconds.

According to another of its subjects, the invention also relates to a process for increasing the attachment (i.e. abrasion resistance) of a cross-linked/cured, water-repellent and non-stick silicone coating, applied to a support, preferably a polymer film, more preferably a polymer film made of polyester, and obtained from a silicone composition capable of cross-linking/curing by polyaddition and as defined above.

Finally, the invention relates to a flexible support (e.g. paper of polymer), preferably a polymer film, more preferably a polymer film made of polyester characterized in that it comprises at least one water-repellent and non-stick coating based on a silicone composition cross-linked/cured by polyaddition and as described above.

The non-stick silicone coatings according to the invention are well and durably attached to flexible supports in particular made of PET, even under harsh humidity and temperature conditions and in prolonged contact with an acrylic adhesive. They are cross-linked/cured (few extractables). They have a peel force profile such that the peeling force remains high even at high speed (good non-stick quality). They are smooth and transparent, which leads to their being made into high-performance label supports.

The following examples are given as an indication and cannot be considered as limiting the field and inventiveness of the invention.

EXAMPLES

Description of the Constituents of the Composition

Vinylated Polymer A
poly(dimethyl)(methyl-vinyl)siloxane with trimethylsiloxy ends with a viscosity of 450 mPa·s and comprising 2.5% by weight of Vi groups.

SiH Cross-Linking Agent B:
polymethylhydrogenosiloxane with trimethylsiloxy ends titrating 46% by weight SiH groups.

Catalyst C:
Karstedt complex titrating 0.2% by weight platinum metal.
Description of the Epoxy Structures Used:
Additive D1=epoxy silicone oil obtained by grafting allyl glycidyl ether (AGE) onto a silicone oil with SiH functions of the $MD_9D'_4M$ type and of average structure: $MD_9D^{AGE}_4M$ (the $D^{AGE}$ groups are distributed on the polymer chain in a random fashion);
Additive D2=ethoxylated epoxy silicone oil, obtained by reacting the ethanol then the AGE with a silicone oil with SiH functions of the $MD'_{55}M$ type, and of average structure: $MD^{OEet}_{33}D^{AGE}_{22}M$;

Additive D3=Epoxy silicone oil obtained by grafting of epoxycyclohexyl groups of average formula below where p=80 and q=7:

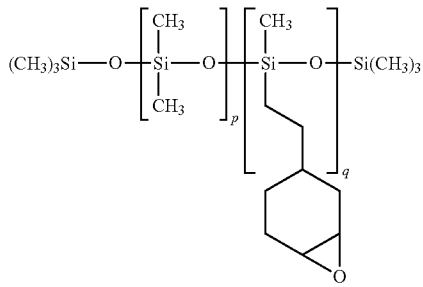

and containing a cationic photoinitiator composition in solution in isopropyl alcohol; The photoinitiator composition used is in solution at 18% in isopropanol and corresponds to the formula:

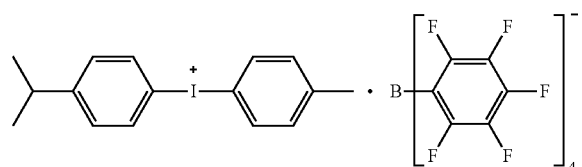

Note:

M represents an $Me_3SiO_{1/2}$ unit

D' represents an $MeHSiO_{2/2}$ unit

D represents an $Me_2SiO_{2/2}$ unit

T represents an $MeSiO_{3/2}$ unit

By NMR, and by reaction with alcoholic potash, the absence of residual SiHs in the epoxy oils D1 and D2 is confirmed. (sensitivity limit: 0.1%)

Coating and Cross-Linking Conditions—Nature & Reference of the PET Film Used

All the coatings were carried on a ROTOMEC 5-roller coating machine, with cross-linking of the silicone applied to the polyester film under the following general conditions:

Type of support coated: Lumirror 60.01 polyester film with a thickness of 30 μm (Supplier: Toray Plastics)

Speed of support-unwinding machine: 100 m/min

Temperature of the ovens: 180° C.

Temperature of support leaving the oven: 139° C.

Example 1

Control Formulation without Epoxidated Additive

Vinylated silicone polymer A (150 g) and the cross-linking agent B (10.4 g) are mixed in a 250 ml powder box. The formulation is mixed carefully before adding the catalyst C (7.5 g). The preparation is stirred once again before being poured into the gap for coating onto the film.

Example 2

Test with 2% Epoxidated Additive D1

The vinylated polymer A (150 g) is mixed with the additive D1 (3.4 g) and the cross-linking agent B (10.4 g) in a 250 ml powder box. The formulation is mixed carefully before adding the catalyst C (7.5 g). The preparation is stirred once again before being poured into the gap for coating onto the film.

Example 3

Test with 2% Epoxidated Additive D2

The vinylated polymer A (150 g) is mixed with the additive D2 (3.4 g) and the cross-linking agent B (10.4 g) in a 250 ml powder box. The formulation is mixed carefully before adding the catalyst C (7.5 g). The preparation is stirred once again before being poured into the gap for coating onto the film.

Example 4

Test with Epoxidated Additive D3 and UV Treatment

Example 1 is repeated, but adding 15% of additive D3 to the formulation.

For this example, before being passed into the oven the silicone-treated film is exposed to UV radiation, by being passed under a fusion lamp at a power of 120 W/cm.

Tests:

Once it has left the coating machine the film is subjected to an ageing test which involves applying, in contact with the silicone-treated PET, an acrylic adhesive (RP 40) marketed by UPM-RAFLATAC.

The complex is then placed in a climatic test chamber adjusted to 50° C./70% humidity.

The Rub-Off measurement for verifying the stability of the silicone layer involves, after having peeled off the adhesive, rubbing the index finger over the silicone support in order to impose mechanical stresses on the layer. The number of backward and forward passes with the finger before the appearance of rub-off (or gumming) phenomenon, corresponding to a tearing into shreds of the silicone coating is noted. A score of 10 confirms the excellent stability of the silicone layer.

Conversely, a score of 1 corresponds to the appearance of silicone peelings as from the first backward and forward pass of the finger.

Results/Properties:

The table below summarizes for the different tests carried out:

the silicone deposit, i.e. the quantity of silicone applied per surface of polyester the fraction of silicone extractable with Methyl IsoButylketone (MIBK), i.e. the level of non-cross-linked silicone<0} the "rub-off" resistance of the silicone-treated film, after an increasing period of contact with the acrylic adhesive in a humid oven.

The improvement in the behaviour of the silicone-treated film following the incorporation of the epoxidated additive oils is noted, even after prolonged contact with the adhesive.

| Examples/ Additive | Vinylated polymer | Cross-linking agent | Deposit g/m² | extractables % | Rub-off after contact with the adhesive | | | | | |
|---|---|---|---|---|---|---|---|---|---|---|
| | | | | | 7 days | 14 days | 21 days | 35 days | 42 days | 49 days |
| 1/control without additive | A | B | 0.9 | 7.4 | 10 | 5 | 1 | 1 | 1 | 1 |
| 2/D1 | A | B | 0.83 | 5.5 | 10 | 10 | 10 | 10 | 10 | 10 |
| 3/D2 | A | B | 0.98 | 5.4 | 10 | 10 | 10 | 10 | 10 | 10 |
| 4/D3 + UV | A | B | 0.86 | — | 10 | 10 | 10 | 10 | 10 | 10 |

The invention claimed is:

1. Silicone composition capable of cross-linking/curing by polyaddition, for forming a coating which is water-repellent and non-stick on a support, and comprising:

(A) an alkenylated silicone component containing at least one functional silicone oil comprising at least one PolyOrganoSiloxane (POS) comprising units of formula (I.1)

$$W_a Z_b SiO_{\frac{4-(a+b)}{2}} \quad (I.1)$$

in which:
W represents independently a functional alkenyl group,
Z represents independently a monovalent hydrocarbon group, with no unfavourable effect on the activity of the catalyst and selected from the group consisting of the methyl, ethyl, propyl and 3,3,3-trifluoropropyl groups,
a is 1 or 2, b is 0, 1 or 2 and a+b is between 1 and 3;

(B) at least one cross-linking silicone oil comprising at least one hydrogenated POS having, per molecule, at least three hydrogen atoms bound to the silicon;

(C) at least one catalyst comprising at least one metal belonging to the platinum group;

(D) at least one attachment promoting additive containing at least one epoxidated silicone oil comprising at least one PolyOrganoSiloxane (POS) comprising:
units of formula (I.2):

$$Y_c Z^1_d SiO_{\frac{4-(c+d)}{2}} \quad (I.2)$$

optionally units of formula (I.3):

$$Z^2_e SiO_{\frac{4-e}{2}} \quad (I.3)$$

optionally units of formula (I.4):

$$Y'_g Z^3_h SiO_{\frac{4-(g+h)}{2}} \quad (I.4)$$

optionally units of formula (I.5):

$$H_i Z^4_j SiO_{\frac{4-(i+j)}{2}} \quad (I.5)$$

formulae in which:
Y represents independently a linear, branched or cyclic epoxy-functional hydrocarbon group;
Y' represents independently an alkoxy-functional group;
$Z^1$, $Z^2$, $Z^3$, $Z^4$ are groups which correspond to the same definition as that given above for the Z groups in the legend to formula (I.1);
c is 1 or 2, d is 0, 1 or 2 and c+d is between 1 and 3;
e is between 0 and 3;
g is 1 or 2, h is 0, 1 or 2 and g+h is between 1 and 3;
i is 1 or 2, j is 0, 1 or 2 and i+j is between 1 and 3; this attachment promoting additive (D) comprising, per molecule, a Si—H unit level at essentially zero, so as to obtain a pot life in a non-gelified liquid state of at least one year, wherein the attachment promoting additive (D) can be preserved for a period of at least one year in a non-gelified liquid state and suitable for use in a composition to be applied to a support in order to form a non-stick coating;

(E) optionally at least one cross-linking inhibitor;
(F) optionally, an adhesion modulating system;
(G) optionally, at least one diluent;
(H) optionally, at least one other functional additive, in particular a "processing aid" operating auxiliary of the "anti-misting" additive type, wherein the attachment promoting additive (D) is selected from the group of silicones consisting of:

1. the POSs containing:
(I.2) units with c=1 and c+d=2: $D^{epoxy}$
optionally (I.2) units with c=1 and c+d=3: $M^{epoxy}$
optionally (I.3) units with e=2: D
optionally (I.4) units with e=1 and g+h=2: $D^{alkoxy}$
optionally (I.4) units with e=1 and g+h=3: $M^{alkoxy}$
optionally (I.5) units with i=1 and i+j=2: D'
optionally (I.5) units with i=1 and i+j=3: M' of formula $$M[D]_{d^o}[D^{alkoxy}]_{d^a}[D^{epoxy}]_{d^e}[D']_{d'}[M^{epoxy}]_{m^e}[M']_{m'}M$$

with
$0 \leq d^o < 500$;
$0 \leq d^a \leq 50$,
$1 \leq d^e \leq 40$;
$0 \leq d' < 1$;
$0 \leq m' < 1$;
d'+m' being less than 1;
$0 \leq m^e \leq 2$;

2. the POSs of average formula:

$$M[D]_{d^o}[D^{epoxy}]_{d^e}[M^{epoxy}]_{m^e}M$$

with $d^o$, $d^e$, $m^e$ as defined above, 3. and mixtures thereof, the attachment promoting additive (D) comprising at least one photoinitiator composition.

2. Composition according to claim 1, wherein the Si—H unit content of this additive (D) is less than or equal to 0.15 by weight in relation to the mass of the POS or POSs constituting (D).

3. Composition according to claim 1, wherein the concentration of attachment promoting additive (D) expressed as % by weight in relation to the total mass of the composition is between 0.1 and 40.

4. Composition according to claim 1, wherein the storage stability is of at least 6 months of storage in surrounding air, the storage stability being defined as the period at the end of which the viscosity of the composition tested has doubled.

5. Composition according to claim 1, wherein the Si—H/Si-alkenyl molar ratio, is such that:

$$1.0 \leq \text{Si—H/Si-alkenyl} \leq 7.$$

6. Composition according to claim 1, wherein A comprises at least one alkenylated silicone oil chosen from the group comprising at least one linear POS having, per molecule, at least two alkenyl groups (bound to the silicon,
of average linear formula: $M^w{}_r(D)_q(D^w)_{q'}M_{r'}$ in which M and D are siloxy units of formula (I.1) with for M: a=0, b=3, for $M^w$: a=1, b=2 and for D: a=0, b=2, $D^w$: a=1, b=1; q and q' are natural integers, r,r'=0, 1 or 2 with r+r'=2;
of viscosity v4 (in mPa·s at 25° C.) defined as follows:

$$75 \leq v4 \leq 4{,}000,$$

and of mass ratio $R^w$ (% by weight) of the Si-alkenyl units to the total mass of the POS of A defined as follows:

$$0.1 \leq R^w \leq 3.5.$$

7. Composition according to claim 1, wherein the cross-linking silicone oil B comprises:
at least one POS (B1) of the following average linear formula:

$$M_\alpha M'_\beta D_\gamma D'_\delta$$

with
$M=(R^1)_3SiO_{1/2}$
$M'=H_a(R^1)_b SiO_{1/2}$, a+b=3, a=1,2 or 3, b=0 to 3
$D=(R^2)_2 SiO_{2/2}$
$D'=HR^3 SiO_{2/2}$
$R^1$, $R^2$, $R^3$ corresponding independently to the same definition as the Z group of formula (I.1);
$\alpha$=0 to 2, $\beta$=2 to 0, $\delta+\gamma$ between 10 and 200;
having a viscosity v5 in mPa·s at 25° C. defined as follows:

$$5 \leq v5 \leq 500$$

and having an Si—H titre (% by weight relative to this POS B1) defined as follows:

$$5 \leq \text{Si—H} \leq 46;$$

and/or at least one branched POS (B2) of the following average formula:

$$M'_g Q_k$$

with
$M'=H_a(R^1)_b SiO_{1/2}$, a+b=3, a=1,2 or 3, b=0 to 3
$Q=SiO_{4/2}$
$4 \leq h \leq 20$; $1 \leq k \leq 4$ or 5
having a viscosity v5 in mPa·s at 25° C. defined as follows:

$$5 \leq v5' \leq 100;$$

and having an Si—H titre (% by weight relative to this POS B2) defined as follows:

$$15 \leq \text{Si—H} \leq 40.$$

8. Composition according to claim 1, having a viscosity v in mPa·s at ° C. defined as follows:

$$100 \leq v \leq 3{,}000.$$

9. Process for producing a water-repellent and non-stick coating on a support, preferably a polymer film, more preferably a polymer film made of polyester, consisting in applying to this support at least one layer of a silicone composition according to claim 1, and ensuring that this layer cross-links, preferably by activating it by heating.

10. Process for increasing the attachment (i.e. abrasion resistance) of a cross-linked/cured, water-repellent and non-stick silicone coating, applied to a support, consisting in obtaining said coating from a silicone composition according to claim 1.

11. Support comprising at least one water-repellent and non-stick coating based on a silicone composition according to claim 1.

12. Silicone composition capable of cross-linking/curing by polyaddition, for forming a coating which is water-repellent and non-stick on a support, and comprising:
(A) an alkenylated silicone component containing at least one functional silicone oil comprising at least one PolyOrganoSiloxane (POS) comprising units of formula (I.1)

$$W_a Z_b SiO_{\frac{4-(a+b)}{2}} \quad (I.1)$$

in which:
W represents independently a functional alkenyl group,
Z represents independently a monovalent hydrocarbon group, with no unfavourable effect on the activity of the catalyst and selected from the group consisting of the methyl, ethyl, propyl and 3,3,3-trifluoropropyl groups,
a is 1 or 2, b is 0, 1 or 2 and a+b is between 1 and 3;
(B) at least one cross-linking silicone oil comprising at least one hydrogenated POS having, per molecule, at least three hydrogen atoms bound to the silicon;
(C) at least one catalyst comprising at least one metal belonging to the platinum group;
(D) at least one attachment promoting additive containing at least one epoxidated silicone oil comprising at least one PolyOrganoSiloxane (POS) comprising:
units of formula (I.2):

$$Y_c Z^1_d SiO_{\frac{4-(c+d)}{2}} \quad (I.2)$$

optionally units of formula (I.3):

$$Z^2_e SiO_{\frac{4-e}{2}} \quad (I.3)$$

optionally units of formula (I.4):

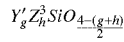 (I.4)

optionally units of formula (I.5):

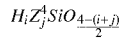 (I.5)

formulae in which:
Y represents independently a linear, branched or cyclic epoxy-functional hydrocarbon group;
Y' represents independently an alkoxy-functional group;
$Z^1$, $Z^2$, $Z^3$, $Z^4$ are groups which correspond to the same definition as that given above for the Z groups in the legend to formula (I.1);
c is 1 or 2, d is 0, 1 or 2 and c+d is between 1 and 3;
e is between 0 and 3;
g is 1 or 2, h is 0, 1 or 2 and g+h is between 1 and 3;
i is 1 or 2, j is 0, 1 or 2 and i+j is between 1 and 3; this attachment promoting additive (D) comprising, per molecule, a Si—H unit level at essentially zero, so as to obtain a pot life in a non-gelified liquid state of at least one year, wherein the attachment promoting additive (D) can be preserved for a period of at least one year in a non-gelified liquid state and suitable for use in a composition to be applied to a support in order to form a non-stick coating;
(E) optionally at least one cross-linking inhibitor;
(F) optionally, an adhesion modulating system;
(G) optionally, at least one diluent;
(H) optionally, at least one other functional additive, in particular a "processing aid" operating auxiliary of the "anti-misting" additive type, wherein the attachment promoting additive (D) is selected from the group of silicones consisting of:
1. the POSs containing:
(I.2) units with c=1 and c+d=2: $D^{epoxy}$
optionally (I.2) units with c=1 and c+d=3: $M^{epoxy}$
optionally (I.3) units with e=2: D
optionally (I.4) units with e=1 and g+h=2: $D_{alkoxy}$
optionally (I.4) units with e=1 and g+h=3: $M_{alkoxy}$
optionally (I.5) units with i=1 and i+j=2: D'
optionally (I.5) units with i=1 and i+j=3: M' of formula

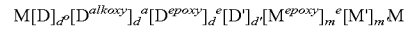

with
$0 \leq d^o < 500$;
$0 \leq d^a \leq 50$,
$1 \leq d^e \leq 40$;
$0 \leq d' < 1$;
$0 \leq m' < 1$;
d'+m' being less than 1;
$0 \leq m^e < 2$;
2. the POSs of average formula:

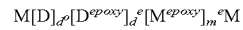

with $d^o$, $d^e$, $m^e$ as defined above,
3. and mixtures thereof,
the attachment promoting additive (D) comprising at least one photoinitiator composition,
at least one attachment promoting co-additive (Dbis) chosen from the epoxy-functional silanes, preferably from the group comprising:
(3,4-epoxycyclohexyl)ethyltriethoxy-silane,
Tris(3-(trimethoxysilyl)propyl)isocyanurate,
GLYMO
MEMO
and mixtures thereof.

* * * * *